3,002,888
LIPID-MOBILIZING COMPOSITION
Joseph Seifter, Berwyn, and David H. Baeder, Philadelphia, Pa., assignors to American Home Products Corporation, New York, N.Y., a corporation of Delaware
No Drawing. Filed June 11, 1958, Ser. No. 741,230
10 Claims. (Cl. 167—74)

This invention relates to a lipid mobilizer obtainable by dialysis from blood of stressed animals or from the posterior pituitary of normal animals, and to its separation and recovery. Our product has value in the regulation of fat mobilization and the controlled depletion of fat depots in the animal organism.

This application is a continuation-in-part of our copending application for a Lipid Mobilizer, Serial No. 559,530, filed January 17, 1956, and of our copending application for Method of Preparing a Lipid Mobilizer, Serial No. 622,536, filed November 16, 1956, both now abandoned.

In recent years extensive investigations have been carried out on the effect of non-specific stress on animal organisms and in particular on the effect of such stress on the lipid content of the blood, liver and fat depots such as subcutaneous, perirenal and epididymal fats. Results have been confusing, showing considerable species variability and also variability with time, with individuals and with diet. For example, Selye said in 1950 (The Physiology and Pathology of Exposure to Stress, Acta Inc., Montreal, 1950, page 145), "We do not wish to attempt any detailed analysis of these conflicting data, but both the facts reported in the literature and our own observations suggest that under normal conditions, in the intact organism, neither cortical extracts nor DCA exert any prominent and constant effect upon the total-lipid and cholesterol content of the blood."

In contrast with this conclusion and subsequent to its publication, we made the observation that the lipemia-clearing action of certain agents in rat blood was consistently inhibited by treatment with cortisone and by exposure to cold. (Proc. Soc. Exptl. Biol. Med., 86 (1954), 709–713.)

These results suggested that under certain conditions a definite and novel lipid mobilizer was developed in the blood. We have now confirmed this and have devised a method for consistently removing and recovering this factor in a highly potent form from blood of a considerable number of species, viz. from humans, dogs, horses and rats, and from the posterior pituitaries of hogs. By "lipid mobilizer" we mean an agent that activates the lipids in the fixed fat depots of the body and causes their movement into the circulatory system.

The $LD_{50}$ in mice, rats, guinea pigs, albino rabbits and dogs of the lipid mobilizer, which we designate here as L.M., has been determined. Also the effect of prolonged intravenous administration to rabbits, dogs and humans has been studied.

In general the gross effect of the administration of L.M. for a controlled period of time has been to produce a persistent hyperlipemia in properly prepared animals, as explained below, and in humans suffering from certain chronic diseases. By "properly prepared," we mean animals in which the function of the liver has been interfered with by the administration of certain insecticides, antioxidants or antibiotics. "Chronic disease" refers to such diseases as cancer of the intestinal tract or liver, leukemia, anemia, uremia and cardiac disease. It is generally recognized in medical practice that all these diseases interfere with the function of the liver. Thus whether or not this mobilization of fat results in an increase of the lipid content of the blood depends on the condition of the liver; the normal liver is capable of handling an increased fat load so that injection of L.M. does not result in general hyperlipemia.

In animals and humans with normally functioning liver, the lipemia is seen only in the blood going to the liver via the portal vein.

We have demonstrated the fat-mobilizing potency of L.M. in animals whose livers were sensitized ("subclinical" fatty liver), e.g. by feeding on chow containing a small amount of toxicant ("Wayne Chow Checkers" supplemented with K penicillin G (4 g./ton) and 0.005% butylated p-hydroxy anisole), or by dips or sprays commonly used to rid animals of parasites. Injection of L.M. in animals so sensitized produced a sharp increase in the plasma content of cholesterol, total fatty acids and lipid phosphorus and in the optical density. On desensitization by changing the diet to a chow which did not contain liver toxicants, L.M. injection did not increase the plasma lipid level but tended to increase the cholesterol and fatty acid content of the liver, as found in experiments with rats.

The toxicity of our lipid mobilizer (L.M.) is low, the effective dose ($ED_{100}$) being not more than $\frac{1}{50}$ the $LD_{50}$. In sensitized rats, intravenous injection of 1 mg./kg. L.M. produced hyperlipemia persisting for 6 hours; 60 mg./kg. produced hyperlipemia lasting 7 days. Repeated single weekly intravenous injections of L.M. in sensitized dogs and rabbits resulted in sustained hyperlipemia in which all elements of the plasma lipids were still elevated at least twofold 7 days after injection. In diseased human patients, intravenous injection of 0.25 to as much as 10 mg./kg. produced elevated plasma concentrations of cholesterol, fatty acids and lipid phosphorus without the development of chills, fever or other signs of toxic reactions.

The overall dosage range for all species ranged from 0.25 mg./kg. to 120 mg./kg. intravenously and 1.0 mg./kg. to 500 mg./kg. intramuscularly. By mouth L.M. has not been observed to have effect in any species.

Our lipid mobilizer has utility in both man and lower animals in rapid mobilization of fats for calories in shock and trauma, depletion of excess fat deposits, and removal of fatty tumors. It may be used in animal husbandry and in veterinary practice, e.g. to ameliorate the condition of obese overfed and underexercised pets.

In humans in conditions in which they are unable by normal physiological mechanism to discharge adequate amounts of L.M. into the blood stream to meet the challenge of shock, trauma, surgery and chronic disease, the administration of L.M. mobilizes adequate amounts of fats for caloric use.

Our dialyzable lipid mobilizer differs from hitherto known lipid-mobilizing agents in substantial respects. Its effective constituent is a non-protein low-molecular-weight polypeptide; it contains no cortisone or other steriods as determined by infrared analysis and by the Porter Silber and Liebermann-Burchard reactions.

Our lipid mobilizer differs from protamine in being dialyzable and heat-stable and in producing lipemia of considerably longer duration and in the absence of the adrenals and the pituitary, both of which are required for such protamine action. It differs from arginine, for example, in that arginine at 5 mg./kg. produced no lipemia in rats and larger doses were fatal. Pituitary gland growth hormone has been reported to be an active lipid mobilizer; our product differs from it in being dialyzable and heat-stable and in failing to promote growth even when accompanied by pronounced hyperphagia. L.M. in fact may produce loss in weight in spite of heavy eating, as will be shown below. Furthermore, we know of no cases where the injection of cortisone increases the amount of growth hormone in circulation, whereas it strongly stimulates the production of L.M. The adipokinetic hormone extractable from the anterior pituitary is free of growth-promoting or ACTH properties but is capable of mobilizing lipids. This hormone, however, also produces ketosis. No ketone bodies have been found in the blood or urine of rats treated with L.M. ACTH stimulates the adrenal cortex and the presence of the adrenals is required for its action. Levin and Farber state (Proc. Soc. Exp. Biol. and Med., 74 (1950), 759): ". . . the property of mobilization of fat to the liver cannot be ascribed solely to the action of adrenocorticotrophic hormone (ACTH) acting via the usually accepted route, e.g. by stimulation of the secretory activity of the adrenal cortex . . . . On the other hand there is almost complete agreement that total adrenalectomy completely prevents fat mobilization by pituitary preparations which are active, in this respect, in intact animals."

L.M. acts in the absence of the adrenals.

The lipid mobilizing factor of our product is present in small detectable amounts in most normal blood, but stress of some sort is required to stimulate its production to substantial levels. In rats we have been able to stimulate its production by cortisone injection, by exposure to cold and by nephrosis produced by injecting anti-kidney serum. Other forms of induced non-specific stress which stimulate the production of L.M. are the injection of protamine and the administration of convulsant drugs such as diisopropylfluorophosphate (DFP) or cholic acid. These are non-specific stressors, acting by stimulating the pituitary gland. We call the result of such stimulation hyperactivity of the pituitary. Trauma and surgical manipulation act in the same way. The ratio of the content of L.M. in untreated and treated plasma in humans, horses, dogs and rats was about 1:300 on the basis of mg./kg. of body weight, but on the basis of volume of original plasma the ratio was about 1:1000. The most practical method for its production so far discovered in cortisone injection, and horses or other ungulates such as cattle serve as the preferred source animals. The amount of cortisone used may vary over a wide range from a minimal dose to near the toxic limit; the so induced production of L.M. will vary in the same sense.

A physiologically identical material is contained in posterior pituitaries of hogs and a simple method, described below, has been devised for its preparation.

The following examples of preparation and use of our L.M. are intended to be illustrative only and not to limit our invention, the scope of which is defined in the appended claims.

EXAMPLE 1A.—PREPARATION FROM HORSE PLASMA BY DIALYSIS

Horses fasted for 24 hours are injected intramuscularly with 5 mg. 11-dihydro-17-hydroxy corticosterone-21 acetate/kg. of body weight. Four hours later they are bled aseptically from the jugular vein into 0.1 M $Na_3$ citrate (1:9 whole blood) and the blood stored at 5° C. for 72 hours to permit settling of the cells. Viscose casing ("No-Jax") is sterilized by exposure to ethylene oxide. The plasma is decanted and dialyzed into an equal volume of sterile demineralized water through the sterilized casing for 72 hours at 25° C. with constant agitation in closed sterile containers. The dialysate is concentrated and dried by freeze-drying.

The product is an amorphous white-to-pale-yellow solid, freely soluble in water, less soluble in methanol and insoluble in ethanol, acetone and other organic solvents; it is not extractable by ether from either acid or alkaline aqueous solutions; it is dialyzable through a semipermeable membrane of the viscose type, comprises a low-molecular-weight-polypeptide as the active ingredient, is non-protein, free of steroids, heat-stable and gives an atypical ninhydrin reaction—at this stage, blue.

Bulk lots may be prepared from several liters of plasma under conditions minimizing bacterial and pyrogen contamination.

EXAMPLE 1B.—FURTHER PURIFICATION

This product while effective and suitable for injection, contains substantial amounts of inorganic salts which are inert as lipid mobilizers.

The L.M. constituent may be further concentrated and purified as disclosed in detail in application of Friedrich W. Zilliken for Method of Purifying a Dialyzable Lipid Mobilizer Contained in Blood, Serial No. 741,229, filed June 11, 1958.

In general the purification steps may comprise adsorption from the aqueous plasma dialyzate to a water-insoluble adsorbent such as benzoic acid, which is soluble in organic solvents, separating the adsorbent and adsorbate from the aqueous phase, dissolving the adsorbent in an organic solvent such as acetone, and separating the undissolved L.M. from the solvent by centrifugation and decantation.

The product contains all the L.M. activity in enhanced potency. It is an amorphous powder, soluble in water and insoluble or difficultly soluble in ethanol, acetone, ethyl ether, chloroform, dioxane, methylethyl ketone, tetrahydrofurane and the like.

This material may be further purified by fractional precipitation from an aqueous solution by the stepwise addition of absolute ethanol, the active fraction coming down at 95 vol. percent ethanol and pH 3.5–4.0.

Further purification may be effected by chromatography on a cellulose column. The 95-percent ethanol fraction may be dissolved in 0.1 N acetic acid, passed through the column and eluted with an n-butanol-acetic-acid-water solution, the eluate being collected in fractions. The active material emerges as a narrow ninhydrin-positive peak.

To obtain the active material in crystalline form, the active fraction is rechromatographed on cellulose and the active fraction dried at low temperature. The residue consists of colorless prismatic needles which on electrophoresis travel as a single spot. This material gives a yellow ninhydrin reaction. On hydrolysis a number of amino acids are obtained and qualitatively identified by paper chromatography. These include alanine, glycine, leucine, glutamic acid and lysine.

This material exhibits maximum L.M. activity in sensitized rats. Pending complete determination of its chemical constitution and structure, it is designated for convenience as L.M.-α.

EXAMPLE 2.—PREPARATION FROM HOG POSTERIOR PITUITARY LOBE

Ten grams of hog posterior pituitary lobe, quick frozen immediately after slaughter, were finely diced with knives on a large mortar and ground to a fine powder with the addition of 3 g. of alcohol-washed sea sand. Physiologic salt solution was added slowly in small aliquots until 100 ml. was thoroughly incorporated. The macerate was centrifuged for two hours at 4000 r.p.m., the supernatant removed, the volume adjusted to 500 ml. with physiologic salt solution, and passed through an ultra-fine porcelain filter resulting in material that was found to be sterile and pyrogen free. The entire procedure was carried out at 5° C. One hundred ml., representing 2 g. of lyophilized posterior lobe, was dialyzed through a viscose casing ("No-Jax") against 400 ml. of deionized water in a sealed container for 24 hours at 5° C. after which the dialyzate was freeze-dried for 18 hours. All steps of the dialysis and freeze-drying were carried out with sterile materials and in sterile containers. The dried material weighing 179 mg. was dissolved in physiologic salt solution to give a final concentration of 0.1% and was then passed through an ultra-fine porcelain filter to furnish a solution suitable for injection. This final product was found to be sterile and pyrogen free.

EXAMPLE 3.—PREPARATION FROM COLD-STRESSED RATS

Sensitized Wistar rats are stressed by placing them for 12 hours in a refrigerator whose temperature is 5°±1° C. The rats are anesthetized with ether and blood obtained by cardiac puncture and diluted with 0.1 M Na citrate (1:9) to prevent clotting. The decanted plasma is dialyzed through viscose casing ("No-Jax") in a water bath containing an equal volume of demineralized water for 6 hours with constant agitation as in Example 1A. The dialyzate is freeze-dried for 72 hours.

EXAMPLE 4.—PREPARATION FOR INJECTION

Our freeze-dried L.M., made as described in Example 1A, may be prepared for injection by dissolving it in water for injection (U.S.P.) to a concentration of 3 percent (mg./ml.), passing the solution through a Selas filter (03) and aseptically filling rubber-stoppered 2 ml. vials with the filtered solution.

EXAMPLE 5.—COMPARISON OF L.M. ACTIVITY FROM TREATED AND UNTREATED ANIMALS

The following Table I gives a comparison of the lipid-mobilizing activity of plasma from treated and untreated animals. The column headings are self-explanatory.

Table 1

L.M. ACTIVITY OF PLASMA DIALYZATES PREPARED FROM UNTREATED AND CORTISONE-INJECTED ANIMALS

| Species | Treatment | Number of animals | Number of dialyzates showing L.M. activity | Hyperlipemic dose of dialyzate mg./kg. intravenously in sensitized rats [1] |
|---|---|---|---|---|
| Human | None | 10 | 10 | 285 |
| Horse | do | 4 | 4 | 300 |
| Do | Cortisone [2] | 6 | 6 | 1 |
| Dog | None | 8 | 3 | 325 |
| Do | Cortisone [2] | 5 | 5 | 1.85 |
| Rat | None | 10 | 10 | 300 |
| Do | Cortisone [2] | 10 | 10 | 0.95 |
| Do | Hypophysectomy cortisone [2] | 10 | 0 | >500 |

[1] Log spaced doses—10 rats/dose for each dialyzate—at least 100 rats per dialyzate.
[2] 5 mg./kg. intramuscular.

EXAMPLE 6.—ACTION OF L.M. FROM HOG POSTERIOR PITUITARY LOBE

L.M. for injection, prepared as described in Example 2, was tested in laboratory animals with the results described below. Concurrently the effects of vasopressin, oxytocin, saline extract of striated muscle, and saline extracts of anterior and posterior lobes of hog pituitaries, respectively, were tested.

All animals were fasted for 18–24 hours before use in an experiment. Adrenalectomized rats were maintained on 0.9% NaCl in drinking water. Hypophysectomized rats were maintained on oranges and white bread. Operated animals were used 10–14 days after surgery. All injections were intravenous into unanesthetized animals. Blood samples from mice, rats and guinea pigs were obtained from the left ventricle of the beating heart exposed under light ether anesthesia. Dogs were bled from the recurrent saphenous vein and rabbits from the marginal ear vein.

No increase in the lipid plasma level of hypophysectomized rats was observed 2 hours after injection when injected with vasopressin, 20 u./kg., oxytocin, 10 u./kg., saline extract of hog anterior pituitary lobe, or saline extract of striated muscle respectively. On the other hand injection of a saline extract of hog posterior pituitary produced a rise in plasma lipid components. L.M. for injection, from the dialyzate of the saline extract of hog posterior pituitary, at a dosage level of 1 mg./kg. produced a pronounced rise in plasma lipid components in several species which lasted for at least 6 hours. In rats, mice and dogs the elevation at the 24th hour was still significant. The following table summarizes the results.

Table II

L.M. FOR INJECTION FROM HOG POSTERIOR PITUITARY LOBE—EFFECT OF 1 MG./KG. (SOLIDS BASIS) ON PLASMA COMPONENTS OF SENSITIZED [1] ANIMALS OF VARIOUS SPECIES WHEN INJECTED INTRAVENOUSLY

| Species | Number | 0 | | | 1 | | | 2 | | | 4 | | | 6 | | | 24 | | |
|---|---|---|---|---|---|---|---|---|---|---|---|---|---|---|---|---|---|---|---|
| | | CH | FA | LP | CH | FA | LP | CH | FA | LP | CH | FA | LP | CH | FA | LP | CH | FA | LP |
| Intact rats | 60 | 62 | 104 | 5 | 196 | 212 | 9 | 262 | 303 | 10 | 302 | 353 | 12 | 348 | 392 | 12 | 184 | 212 | 8 |
| Hypophysectomized rats | 20 | 58 | 92 | 5 | | | | 242 | 303 | 11 | | | | | | | | | |
| Adrenalectomized rats | 20 | 64 | 88 | 5 | | | | 258 | 312 | 11 | | | | | | | | | |
| Mice | 60 | 52 | 95 | 5 | 195 | 208 | 8 | 312 | 340 | 12 | 402 | 386 | 15 | 440 | 490 | 10 | 120 | 212 | 8 |
| Guinea pigs | 60 | 85 | 102 | 5 | 186 | 195 | 9 | 245 | 260 | 10 | 322 | 330 | 11 | 385 | 402 | 13 | 84 | 92 | 6 |
| Rabbits | 12 | 62 | 90 | 5 | 190 | 262 | 9 | 240 | 304 | 11 | 320 | 386 | 13 | 360 | 412 | 14 | 75 | 142 | 8 |
| Dogs | 6 | 120 | 160 | 6 | 290 | 340 | 11 | 380 | 400 | 18 | 412 | 400 | 19 | 402 | 440 | 18 | 196 | 220 | 9 |

[1] Mice and rats were fed Wayne Chow Checkers (see above); guinea pigs and rabbits were sprayed with "Gulf Live Stock Spray"; dogs were dipped in a chlordane dip; guinea pigs, rabbits and dogs received chow containing aureomycin.

NOTE.—CH=total plasma cholesterol; FA=total fatty acids; LP=lipid phosphorus; mg. percent.

EXAMPLE 7.—EFFECT OF L.M. ON PLASMA LIPIDS OF SENSITIZED ANIMALS OF VARIOUS SPECIES

The following Table III shows the change in content and composition of plasma lipids in various species in one hour after intravenous injection. Initial and final results are shown in mg. percent for cholesterol, fatty acids, lipid phosphorus and optical density.

EXAMPLE 9.—WEIGHT, FOOD INTAKE AND PLASMA LIPIDS OF L.M.-TREATED SENSITIZED [2] RABBITS

Table V gives data for rabbits similar to those given for dogs in Example 8.

Table V

EFFECT OF L.M. (MEAN VALUES MG. PERCENT) ON PLASMA LEVELS OF LIPIDS IN 10 RABBITS 60 MG. DIALYZATE/KG. IV ONCE WEEKLY

| | Week of treatment | | | | | | | | | | | |
|---|---|---|---|---|---|---|---|---|---|---|---|---|
| | 0 | | 1 | | 2 | | 4 | | 5 | | 6 | |
| | T | C | T | C | T | C | T | C | T | C | T | C |
| Total CH | 72 | 60 | 150 | 58 | 200 | 65 | 290 | 65 | 350 | 60 | 350 | 62 |
| Total fatty acid | 200 | 200 | 325 | 210 | 400 | 205 | 490 | 205 | 580 | 210 | 575 | 210 |
| Lipid P | 6 | 6 | 9 | 6 | 13 | 6 | 13 | 6 | 14 | 6 | 13 | 6 |
| Gms. food taken daily | 190 | 190 | 300 | 200 | 575 | 225 | 800 | 250 | 950 | 275 | 1,000 | 275 |
| Body weight (kg.) | 2.4 | 2.4 | 2.7 | 2.9 | 2.5 | 3.3 | 2.6 | 3.8 | 2.8 | 4.0 | 2.7 | 4.2 |

EXAMPLE 10.—COMPARISON OF THE ACTION OF L.M. ON SENSITIZED AND UNSENSITIZED RATS

The data in the following Table VI demonstrate the effect of L.M. on concentration of lipids in liver and Table III MEAN CONCENTRATIONS (MG. PERCENT) OF LIPIDS IN PLASMA OF SENSITIZED [1] ANIMALS 1 HOUR AFTER INJECTION OF L.M.

| Animal | Number | Mg./kg. | Total Ch | | FA | | LP | | OD | |
|---|---|---|---|---|---|---|---|---|---|---|
| | | | Initial | 1 hr. | Initial | 1 hr. | Initial | 1 hr. | Initial | 1 hr. |
| Mice | 100 | 0.5 | 53 | 174 | 148 | 450 | 5 | 12 | 0.05 | 0.90 |
| Rats | 475 | 0.10 | 72 | 190 | 155 | 480 | 5 | 13 | 0.04 | 0.86 |
| Guinea pigs | 100 | 0.50 | 66 | 185 | 160 | 440 | 5 | 12 | 0.06 | 0.80 |
| Rabbits | 40 | 0.50 | 50 | 172 | 200 | 420 | 5 | 11 | 0.05 | 0.86 |
| Dogs | 20 | 1 | 86 | 168 | 209 | 430 | 6 | 11 | 0.05 | 0.92 |

[1] As in Table II.
NOTE.—Ch=cholesterol; FA=fatty acids; LP=lipid phosphorus; OD=(optical density); negative logarithm of transmittance= $\log_{10}T$.

EXAMPLE 8.—WEIGHT, FOOD INTAKE AND PLASMA LIPIDS OF L.M.-TREATED SENSITIZED [1] DOGS

The following Table IV shows the effect on dogs of continued treatment with intravenous L.M. Plasma lipid concentration and composition, daily food intake and change in body weight are shown for treated (columns headed T) and untreated (columns headed C) dogs during 7 weeks of treatment and two subsequent weeks.

[1] Sensitized by dripping in a chlordane dip and by aureomycin in their food.

plasma of fasted rats during desensitization and resensitization. The largest accumulation of lipids in liver as a result of fasting occurred in rats exposed longest to the Wayne diet. Two hours after intravenous injection of 5 mg. L.M./kg. sensitized, fasted rats had an elevation of total cholesterol and total fatty acids in plasma and a decrease of cholesterol in liver. As desensitization proceeded L.M. produced a progressive decline in plasma

[2] Sensitized by exposure to "Gulf Live Stock Spray" and by aureomycin in their food.

Table IV

EFFECT OF L.M. (MEAN VALUES MG. PERCENT) ON PLASMA LEVELS OF LIPIDS IN 6 SENSITIZED DOGS (60 MG. DIALYZATE KG. IV ONCE WEEKLY)

| | Week of treatment | | | | | | | | | | | | | | | | | | | |
|---|---|---|---|---|---|---|---|---|---|---|---|---|---|---|---|---|---|---|---|---|
| | 0 | | 1 | | 2 | | 3 | | 4 | | 5 | | 6 | | 7+ | | 8 | | 9 | |
| | T | C | T | C | T | C | T | C | T | C | T | C | T | C | T | C | T | C | T | C |
| Total CH | 83 | 84 | 165 | 50 | 190 | 91 | 220 | 95 | 245 | 90 | 240 | 90 | 210 | 75 | 240 | 60 | 202 | 85 | 189 | 86 |
| Ester CH | 58 | 59 | 110 | 58 | 118 | 61 | 134 | 63 | 150 | 61 | 142 | 59 | 135 | 53 | 142 | 51 | 122 | 59 | 110 | 58 |
| Total FA | 212 | 213 | 440 | 208 | 520 | 270 | 680 | 225 | 590 | 206 | 540 | 208 | 606 | 200 | 630 | 218 | 420 | 209 | 250 | 215 |
| Lipid P | 7 | 6 | 12 | 6 | 12 | 7 | 14 | 7 | 13 | 7 | 13 | 7 | 12 | 6 | 13 | 6 | 10 | 7 | 8 | 7 |
| Gms. food taken daily | 265 | 250 | 370 | 265 | 540 | 275 | 550 | 280 | 550 | 275 | 552 | 270 | 550 | 280 | 550 | 280 | 500 | 280 | 450 | 280 |
| Body weight (kg.) | 6 | 6 | 6 | 7 | 5 | 7 | 4 | 8 | 4 | 8 | 4 | 8 | 4 | 9 | 5 | 8 | 6 | 8 | 9 | 8 |

NOTE.—CH=cholesterol; T=receiving L.M.; C=control; FA=fatty acids; (+)=L.M. discontinued.

cholesterol and fatty acids and an increase in accumulation of cholesterol and total fatty acids in liver. Resensitization resulted in reappearance of the hyperlipemia and decrease in liver cholesterol.

Table VI
EFFECT OF L.M. ON LIPIDS IN LIVER (PERCENT) AND PLASMA (MG. PERCENT) 2 HR. AFTER 5 MG./KG. IV, 10 RATS/SERIES

| Week | Diet | Liver fasted, L.M. | | Plasma fasted, L.M. | | Liver fasted, no L.M. | | Plasma fasted, no L.M. | |
|---|---|---|---|---|---|---|---|---|---|
| | | CH | FA | CH | FA | CH | FA | CH | FA |
| S 0 | Wayne | 1.9 | 3.4 | 202 | 400 | | | | |
| 1 | Warner | 3.4 | 3.4 | 143 | 174 | | | | |
| 2 | | 4.6 | 4.9 | 82 | 102 | | | | |
| 3 | | 4.8 | 4.9 | 64 | 96 | | | | |
| 4 | | 4.4 | 4.2 | 62 | 84 | .6 | 1.2 | 56 | 80 |
| S 5 | Wayne | 4.3 | 4.1 | 60 | 85 | .9 | 1.8 | 64 | 86 |
| S 6 | | 2.2 | 3.9 | 74 | 90 | 1.8 | 2.6 | 60 | 87 |
| S 7 | | 1.2 | 3.7 | 200 | 374 | 3.0 | 3.2 | 60 | 86 |

NOTE.—CH=cholesterol; FA=total fatty acids; S=Sensitized by chow containing K penicillin G (4 g./ton) and 0.005% butylated parahydroxyanisole (Wayne Chow Checkers).

EXAMPLE 11.—ROLE OF THE LIVER ON FAT MOBILIZATION IN DOGS

Tests were carried out on dogs with normal livers and on dogs with subclinically damaged livers due to exposure to chlorinated-hydrocarbon insecticides and antibiotic in their chow. Dogs were anesthetized with intravenous nembutal and through a laparotomy incision a polyvinyl catheter was inserted into the superior mesenteric vein which drains into the portal vein. The laparotomy incision was closed. A catheter was inserted into the vena cava so that the tip lay between the liver and the heart. These samples were designated posthepatic. Simultaneous samples were obtained at the start of the experiment. The L.M. (5 mg./kg.) was injected intravenously and blood samples obtained at appropriate intervals. The plasmas were analyzed for blood lipids.

of all plasma lipid components following a single injection which persisted for at least 24 hours. Samples obtained 24 hours after the 4th injection and 5th injection also showed marked elevation of all lipid components. H., suffering from moderate internal hydrocephalus and partial right hemiplegia (Table IX), who received the material for 12 consecutive days, also showed marked elevations of plasma lipid components.

Table VIII
EFFECT OF CHRONIC ADMINISTRATION OF L.M., 1 MG./KG. IV/DAY, 5 DAYS (F.)

| Time | Plasma lipid components (mg. percent) | | |
|---|---|---|---|
| | Total cholesterol | Total fatty acids | Lipid phosphorus |
| Control | 286 | 320 | 6.28 |
| Do | 262 | 312 | 5.96 |
| 3 hrs. after inj. No. 1 | 502 | 666 | 13.28 |
| 24 hrs. after inj. No. 1 | 596 | 484 | 10.42 |
| 24 hrs. after inj. No. 4 | 418 | 408 | 9.22 |
| 24 hrs. after inj. No. 5 | 462 | 413 | 8.72 |

Table IX
EFFECT OF CHRONIC ADMINISTRATION OF L.M., 1 MG./KG. IV/DAY FOR 12 DAYS (H.)

| Time | Plasma lipid components (mg. percent) | | |
|---|---|---|---|
| | Total cholesterol | Total fatty acids | Lipid phosphorus |
| Pre-treatment | 240 | 352 | 7.92 |
| 1 hr. after inj. No. 1 | 418 | 872 | 12.65 |
| 3 hrs. after inj. No. 1 | 512 | 940 | 14.62 |
| 24 hrs. after inj. No. 1 | 362 | 758 | 10.84 |
| 24 hrs. after inj. No. 2 | 495 | 806 | 11.62 |
| 24 hrs. after inj. No. 5 | 542 | 900 | 12.84 |
| 1 hr. after inj. No. 6 | 872 | 1,002 | 18.69 |
| 2 hrs. after inj. No. 6 | 906 | 1,058 | 19.55 |
| 24 hrs. after inj. No. 8 | 524 | 796 | 10.96 |
| 24 hrs. after inj. No. 9 | 562 | 824 | 11.92 |
| 6 hrs. after inj. No. 10 | 854 | 986 | 14.65 |
| 24 hrs. after inj. No. 12 | 672 | 842 | 13.85 |

Table VII
ROLE OF LIVER ON FAT MOBILIZATION IN DOGS

| | | Time (hrs.)—Injection of L.M. | | | | | | | | | | |
|---|---|---|---|---|---|---|---|---|---|---|---|---|
| | | 0 | | | ¼ | | | 1 | | | 2 | | |
| | | Plasma Lipids (mg. percent) | | | | | | | | | | |
| | | CH | FA | LP | CH | FA | LP | CH | FA | LP | CH | FA | LP |
| Dogs with normal liver | Superior mesenteric vein (prehepatic) | 60 | 140 | 4 | 62 | 310 | 4 | 58 | 325 | 5 | 58 | 350 | 5 |
| | Posthepatic vena cava | 82 | 148 | 6 | 92 | 160 | 6 | 100 | 150 | 5 | 100 | 152 | 5 |
| Dogs with damaged liver | Superior mesenteric vein (prehepatic) | 52 | 130 | 3 | 56 | 326 | 3 | 70 | 400 | 6 | 75 | 400 | 6 |
| | Posthepatic vena cava | 82 | 150 | 6 | 90 | 162 | 6 | 175 | 300 | 6 | 300 | 325 | 9 |

NOTE.—CH=total cholesterol; FA=total fatty acids. LP=lipid phosphorus.

EXAMPLE 12.—EFFECT OF L.M. ON HUMANS

Two patients were placed on chronic administration of 1 mg./kg. L.M. intravenously per day. Samples were drawn at various intervals as indicated in Tables VIII and IX and the change in plasma lipid components measured.

*Results.*—F., a 71 year old male suffering from cerebral infarction, (Table VIII) showed an immediate elevation

EXAMPLE 13.—EFFECT OF A SINGLE INJECTION OF L.M. ON PLASMA LIPIDS IN 8 PATIENTS

Patients suffering from the indicated diseases were fasted overnight. A sample of blood was obtained from the cubital vein. L.M. was injected intravenously and then blood samples were taken from the cubital vein at appropriate intervals and analyzed for plasma lipids. Results are shown in the following Table X.

Table X

| Case No. and diagnosis | Dose of L.M. mg./kg. | Time in hrs. | Plasma lipids mg./100 ml. | | |
|---|---|---|---|---|---|
| | | | TCH | TFA | LP |
| 1. Generalized carcinoma | 0.25 | 0 | 126 | 282 | 6.85 |
| | | ½ | 238 | 341 | 10.07 |
| | | 1 | 275 | 354 | 10.37 |
| | | 2 | 244 | 358 | 10.59 |
| | | 3 | 238 | 367 | 9.18 |
| 2. Metastatic carcinoma of rectum | 0.50 | 0 | 132 | 275 | 7.00 |
| | | ½ | 263 | 392 | 10.52 |
| | | 1 | 290 | 411 | 10.98 |
| | | 2 | 285 | 400 | 11.20 |
| | | 3 | 276 | 398 | 11.90 |
| 3. Metastatic carcinoma of stomach. | 1.0 | 0 | 186 | 295 | 7.2 |
| | | ½ | 288 | 392 | 10.55 |
| | | 1 | 310 | 404 | 11.69 |
| | | 2 | 309 | 399 | 11.88 |
| | | 3 | 326 | 408 | 11.42 |
| 4. Acute myelogenous leukemia | 1.0 | 0 | 122 | 202 | 4.28 |
| | | ½ | 650 | 440 | 14.07 |
| 5. Cerebral vascular accident with thrombocytopenic purpura. | 1.0 | 0 | 172 | 301 | 6.8 |
| | | ½ | 322 | 486 | 11.28 |
| | | 1 | 344 | 480 | 11.67 |
| | | 2 | 388 | 492 | 11.80 |
| | | 3 | 298 | 490 | 11.25 |
| 6. Metastatic carcinoma of rectum | 1.0 | 0 | 210 | 325 | 6.9 |
| | | ½ | 395 | 512 | 11.55 |
| | | 1 | 412 | 492 | 11.91 |
| | | 2 | 404 | 488 | 12.24 |
| | | 3 | 400 | 486 | 12.02 |
| 7. Rheumatoid arthritis | 1.0 | 0 | 235 | 318 | 6.24 |
| | | 2 | 482 | 526 | 12.28 |
| | | 6 | 312 | 442 | 11.68 |
| | | 24 | 322 | 402 | 10.95 |
| 8. Rheumatoid arthritis | 1.0 | 0 | 302 | 329 | 7.0 |
| | | 2 | 486 | 502 | 11.24 |
| | | 6 | 520 | 586 | 12.86 |
| | | 24 | 418 | 492 | 10.41 |

Note.—TCH=total cholesterol; TFA=total fatty acids; LP=lipid phosphorus.

EXAMPLE 14.—MOBILIZATION OF LIPIDS FROM OMENTAL AND MESENTERIC FAT DEPOTS BY L.M. IN HUMANS

A human female patient requiring an abdominal operation was fasted overnight. This patient had a normally functioning liver. Pre-operatively a blood sample was taken from the cubital vein. A laparotomy was performed and blood samples obtained from the gastroepiploic vein and artery. Three hundred mg. L.M. (5 mg./kg.) was then administered to the patient intravenously. Twenty minutes later blood samples were again obtained from the gastro-epiploic vein and artery. Blood samples were obtained from the cubital vein 5 and 24 hours after administration of L.M. The plasmas were analyzed for the various lipid fractions. The gastroepiploic veing transports blood to the portal vein and therefore represents pre-hepatic blood; the gastro-epiploic artery transports blood from the aorta to the mesentery and omental fat depots.

Table XI
LIPID MOBILIZATION IN A PATIENT HAVING A NORMALLY FUNCTIONING LIVER AND UNDERGOING AN OPERATION

| | Plasma lipids mg./100 ml. | |
|---|---|---|
| | TCH | TFA |
| PERIPHERAL AND POST-HEPATIC BLOOD | | |
| Cubital vein, preoperatively, before L.M. injection | 317 | 382 |
| 5 hours after L.M. injection | 396 | 402 |
| 24 hours after L.M. injection | 399 | 414 |
| PRE-HEPATIC BLOOD | | |
| Gastroepiploic vein, before L.M. injection | 308 | 352 |
| 20 minutes after L.M. injection | 328 | 524 |
| PERIPHERAL AND POST-HEPATIC BLOOD | | |
| Gastroepiploic artery, before L.M. injection | 312 | 356 |
| 20 minutes after L.M. injection | 330 | 360 |

Note.—TCH=total cholesterol; TFA=total fatty acids.

The stress of a surgical operation normally results in lipid mobilization from the fat depots into the blood stream and transport to the liver to meet the increased caloric demands of the organism. This action, however, ordinarily requires several hours, say 2 to 4, to reach an effective level. The data in Table XI show that the administration of L.M. can anticipate the body's need for fats, under operative stress, by considerably more than an hour—with consequent benefit to the patient at a critical time. In the present case the total fatty acid content of the blood going to the liver rose from 352 to 524 mg./100 ml. in 20 minutes after receiving an injection of L.M.—a rise of 50 percent. The liver of this patient was able to handle this increased supply as evidenced by the substantially unchanged fat levels in post hepatic blood—cubital vein and gastroepiploic artery.

From the above disclosure it will be apparent that we have discovered a novel and potent lipid-mobilizing factor useful in several fields of human and veterinary therapy and have devised a method for its preparation in a useful injectable form.

We claim:

1. The method of preparing a lipid-mobilizing composition having the property when injected of mobilizing fat into the blood stream which comprises: subjecting a mammal to non-specific stress such as to cause hyperactivity of the posterior pituitary gland, thereafter removing blood from said stressed animal, separating the plasma from the whole blood, dialyzing the plasma through a semi-permeable membrane against water in the absence of an organic solvent, and freeze-drying the dialyzate.

2. The method according to claim 1 in which the stressor is cortisone.

3. The method according to claim 1 in which the stressor is subjection to a sub-normal temperature above 0° C.

4. The method according to claim 1 in which the stressor is a convulsant drug.

5. The method of preparing a lipid-mobilizing composition having the property when injected of mobilizing fat into the blood-stream which comprises injecting cortisone into an ungulate, thereafter bleeding the injected animal and collecting the blood, separating the plasma from the whole blood, dialyzing the plasma through a semipermeable membrane against water in the absence of an organic solvent and under sterile and pyrogen-free conditions, and freeze-drying the dialyzate.

6. The method of preparing a parenteral solution which comprises dissolving the dried solid product of the process defined in claim 5 in water for injection (U.S.P.) in a physiologically effective concentration, filtering the resulting solution through a bacterial filter, and filling the resulting filtrate under aseptic conditions into sterile containers.

7. A composition suitable for parenteral injection when dissolved in water and having the property of mobilizing fat from the fat depots into the blood stream of injected animals, said composition being the dialyzate obtained by dialysis against water, in the absence of an organic solvent, of the blood plasma of non-specifically stressed mammals, the stress being such as to cause hyperactivity of the posterior pituitary gland, said composition being free of proteins, ACTH and steroids and comprising inert salts and an active constituent designated as L.M.-α, said L.M.-α being isolatable from said composition by fractional adsorption, fractional precipitation from aqueoue ethanol and fractional chromatography on cellulose, said L.M.-α being a white crystalline solid polypeptide giving a positive yellow ninhydrin reaction, soluble in water and dilute ethanol, insoluble in non-polar organic solvents, yielding on acid hydrolysis the following amino acids—alanine, glycine, leucine, glutamic acid and lysine—traveling as a single spot on electrophoresis, and having a high lipid-mobilizing potency.

8. A parenteral solution comprising the composition defined in claim 7 dissolved in a physiologically effective concentration in a pyrogen-free aqueous medium.

9. The method of treating an animal organism to mobilize fat from fat depots of the organism into the blood stream to meet increased fat demand under stress conditions which comprises parenterally injecting into the animal the solution defined in claim 8 in an amount in the range from 0.25 to 120 mg. per kg. of body weight.

10. L.M.-α being a substance elaborated in recoverable amounts by the hyperactivity of the posterior pituitary gland of non-specifically stressed mammals and isolatable from the dialyzate against water, in the absence of an organic solvent, of the blood plasma of such stressed mammals, said L.M.-α having the property when parenterally injected of mobilizing fat from the fat depots into the blood stream of injected animals, said L.M.-α consisting essentially of a white crystalline solid polypeptide, free of inert blood salts, proteins, ACTH and steroids, giving a positive yellow ninhydrin reaction, being soluble in water and dilute ethanol, insoluble in nonpolar organic solvents, yielding on acid hydrolysis the following amino acids—alanine, glycine, leucine, glutamic acid and lysine—and traveling as a single spot on electrophoresis.

References Cited in the file of this patent

UNITED STATES PATENTS 2,433,879    Wretlind _____ Jan. 6, 1948

OTHER REFERENCES

Bongiovanni: Proc. of the Soc. for Exptl. Biol. and Med., vol. 87, November 1954, pp. 282, 286.

Axelrod: Arch. of Biochem. and Biophy. 50: 2, June 1954, pp. 347–353.

Levin: Procs. of the Soc. for Exptl. Biol. and Med., vol. 74, 1950, pp. 758–763.

Stumph: Proc. of the Soc. for Exptl. Biol. and Med., vol. 86, 1954, pp. 219–223.

Kleiner: Human Biochem., 3rd ed., 1951, Mosby Co., St. Louis, Mo., p. 596.

Pincus: The Hormones, Academic Press, N.Y., vol. 2, 1950, pp. 453–471; vol. 3, 1955, pp. 254–256, 281–282, 400–425.

Rosenberg: PSEBM, vol. 82, 1953, pp. 701–707.

Heffter, A.: Handbuch der Experimentallen Pharmakologie, vol. 3, Edwards Bro., Inc., Ann Arbor, Mich., 1945, as cited in PSEBM 91: 1, January 1956, pp. 42–45.

UNITED STATES PATENT OFFICE
CERTIFICATE OF CORRECTION

Patent No. 3,002,888                                          October 3, 1961

Joseph Seifter et al.

It is hereby certified that error appears in the above numbered patent requiring correction and that the said Letters Patent should read as corrected below.

Column 3, line 58, for "in" read -- is --; column 5, line 45, for "water for injection" read -- Water for Injection --; column 7, line 58, in the footnote, for "dripping" read -- dipping --; columns 7 and 8, Table IV, last portion of the title, for (60 MG. DIALYZATE KG. IV ONCE WEEKLY)" read (60 M.G. DIALYZATE/KG. IV ONCE WEEKLY) --; column 11, Table X, under the heading "LP" line 10 thereof, for "11.90" read -- 10.90 --; same column 11, line 50, for "veing" read -- vein --; column 12, lines 67 and 68, for "aqueoue" read -- aqueous --.

Signed and sealed this 8th day of May 1962.

(SEAL)
Attest:

ERNEST W. SWIDER                                  DAVID L. LADD
Attesting Officer                                    Commissioner of Patents